United States Patent
Shuster

(10) Patent No.: US 11,537,523 B2
(45) Date of Patent: Dec. 27, 2022

(54) COMMAND RESULT CACHING FOR BUILDING APPLICATION CONTAINER IMAGES

(71) Applicant: RED HAT, INC., Raleigh, NC (US)

(72) Inventor: Boaz Shuster, Kefar Saba (IL)

(73) Assignee: Red Hat, Inc., Raleigh, NC (US)

( * ) Notice: Subject to any disclaimer, the term of this patent is extended or adjusted under 35 U.S.C. 154(b) by 668 days.

(21) Appl. No.: 16/528,014

(22) Filed: Jul. 31, 2019

(65) Prior Publication Data
US 2021/0034537 A1    Feb. 4, 2021

(51) Int. Cl.
| | | |
|---|---|---|
| G06F 12/0875 | (2016.01) | |
| H04L 9/32 | (2006.01) | |
| G06F 3/06 | (2006.01) | |
| G06F 12/0864 | (2016.01) | |

(52) U.S. Cl.
CPC .......... G06F 12/0875 (2013.01); G06F 3/067 (2013.01); G06F 3/0611 (2013.01); G06F 3/0659 (2013.01); G06F 12/0864 (2013.01); H04L 9/3239 (2013.01); *G06F 2212/452* (2013.01)

(58) Field of Classification Search
CPC .. G06F 12/0875; G06F 3/0611; G06F 3/0659; G06F 3/067; G06F 12/0864; G06F 2212/452; H04L 9/3239
USPC .......................................................... 717/100
See application file for complete search history.

(56) References Cited

U.S. PATENT DOCUMENTS

| | | | |
|---|---|---|---|
| 8,239,847 B2 | 8/2012 | Yu et al. | |
| 9,396,334 B1 * | 7/2016 | Ivanov | G06F 21/56 |
| 9,507,568 B2 | 11/2016 | Ringseth | |
| 10,209,963 B2 | 2/2019 | Hutchison | |
| 10,762,197 B1 * | 9/2020 | Yu | H04L 9/50 |
| 10,824,420 B2 * | 11/2020 | Collins | G06F 8/10 |
| 2014/0195782 A1 * | 7/2014 | Yap | G06F 9/3016 |
| | | | 712/208 |
| 2015/0033229 A1 * | 1/2015 | Tegtmeier | H04L 67/10 |
| | | | 718/1 |
| 2015/0347055 A1 * | 12/2015 | Truong | G06F 3/0653 |
| | | | 711/168 |

(Continued)

OTHER PUBLICATIONS

Sochat et al, "Enhancing reproducibility in scientific computing: Metrics and registry for Singularity containers". 2017, [Online], pp. 1-24, [Retrieved from internet on Jul. 31, 2022], <https://journals.plos.org/plosone/article/file?id=10.1371/journal.pone.0188511&type=printable> (Year: 2017).*

(Continued)

*Primary Examiner* — S. Sough
*Assistant Examiner* — Zengpu Wei
(74) *Attorney, Agent, or Firm* — Lowenstein Sandler LLP

(57) ABSTRACT

Implementations of the disclosure provide systems and methods for receiving, by a processing device, a request for an application image. A sequence of commands associated with the application image and a value of a parameter associated with the sequence of commands is received. Responsive to determining that the sequence of commands has been previously executed with the value of the parameter, the processing device retrieves, from a cache, a result of executing the sequence with the value of the parameter. The application image is built using the first result of executing the sequence.

20 Claims, 7 Drawing Sheets

(56) References Cited

U.S. PATENT DOCUMENTS

2016/0350098 A1* 12/2016 Kuchibhotla ............. G06F 8/65
2018/0322065 A1* 11/2018 Yaroshevich ......... G06F 9/3017
2018/0336345 A1   11/2018 Georgiev
2019/0187982 A1*  6/2019 Mathew ..................... G06F 8/71
2021/0097043 A1*  4/2021 Xiao ..................... G06F 3/0604

OTHER PUBLICATIONS

Moore, P. (2019). "Memoizing (Caching) the Return Values of Functions", Safari Books Online, https://www.oreilly.com/library/view/python-cookbook/0596001673/ch17s08.html. 5 pages.
Minnihan, J, (Jul. 16, 2014). "Understanding the Docker Cache for Faster Builds". The New Stack, https://thenewstack.io/understanding-the-docker-cache-for-faster-builds/. 3 pages.
"Image Caching" downloaded May 1, 2019. https://documentation.codeship.com/pro/builds-and-configuration/caching/, 7 pages.

* cited by examiner

| command name 310 | arguments 320 | change date 330 | path 340 | result 350 | is cacheable? 360 |
|---|---|---|---|---|---|
| echo | hello world | 23/09/2000 | /bin/ | hello world | true |
| my-cli | --r --d url | 10/05/2018 | /home/u/ | status OK | false |
| add | 10 10 | 10/05/2018 | /home/u/ | 20 | true |
| my-cli | --r --d url | 10/05/2018 | /home/u/ | status FAILURE | false |
| echo | hello world | 23/09/2000 | /bin/ | hello world | true |
| add | 10 10 | 10/05/2018 | /home/u/ | 20 | true |
| git | clone url1 | 01/02/2001 | /usr/bin/ | ...files...content...1 | false |
| git | clone url1 | 01/02/2001 | /usr/bin/ | ...files...content...2 | false |

Figure 3

COMMAND RESULT CACHING FOR BUILDING APPLICATION CONTAINER IMAGES

TECHNICAL FIELD

Embodiments of the present disclosure relate to a computer system, and more specifically, relate to caching command results for building application container images.

BACKGROUND

Containerization is an operating system level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure is illustrated by way of example, and not by way of limitation, and may be more fully understood with references to the following detailed description when considered in connection with the figures, in which:

FIG. 3 illustrates a data structure for identifying cacheable command results, in accordance with implementations of the present disclosure.

DETAILED DESCRIPTION

Figure 1:
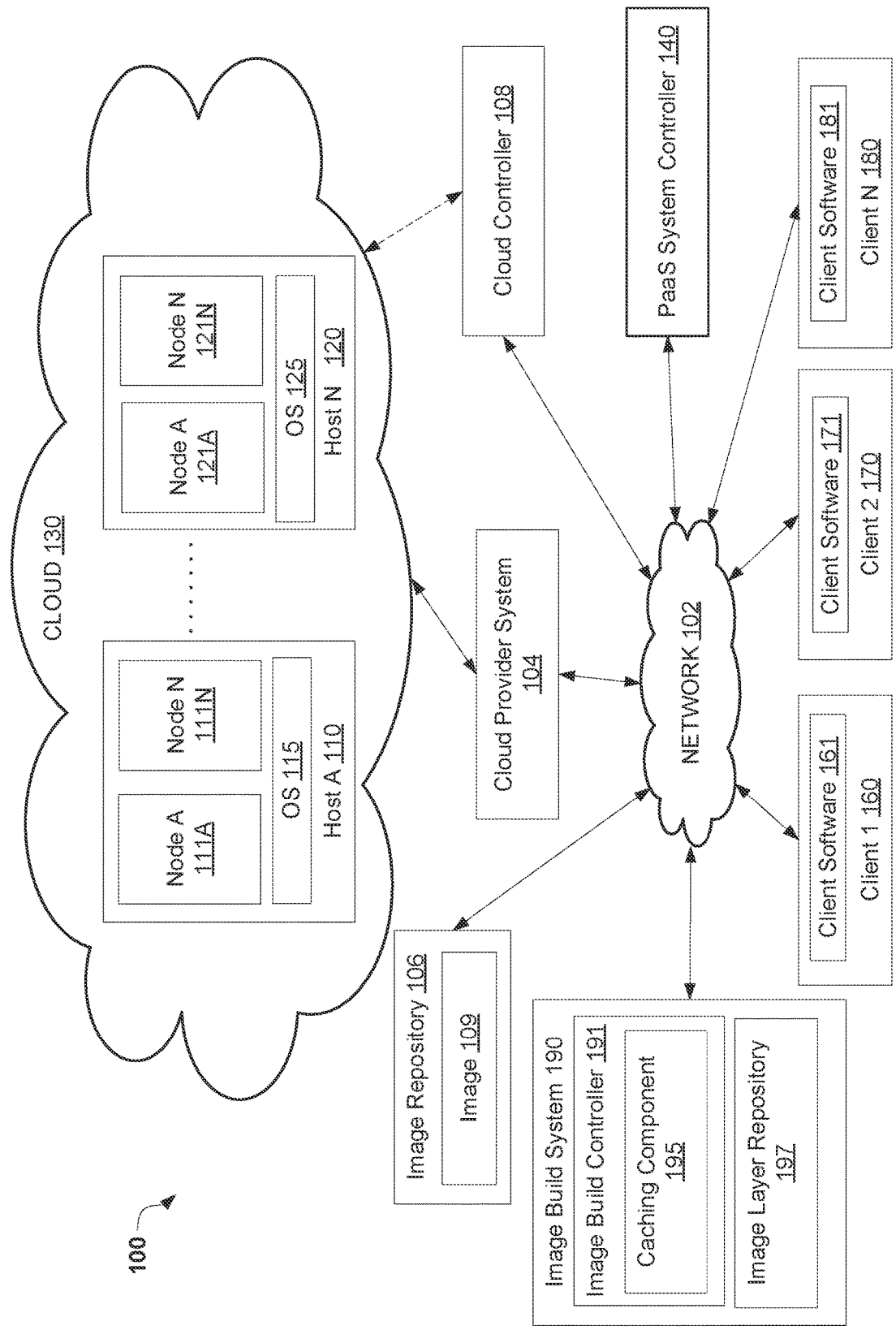
FIG. 1 is a block diagram of a network architecture in which implementations of the disclosure may operate.

Containers are used in various types of systems to provide a secure environment that is isolated from other processes on the system. Many Platform-as-a-Service (PaaS) systems, such as OpenShift™, utilize containers to provide virtual services to clients. A PaaS system provides a platform and environment that allows clients to build applications and services over the internet. Although implementations of the disclosure are described in accordance with a PaaS system, this should not be considered as limiting the scope or usefulness of the features of the disclosure. For example, the techniques and features described herein can be used with other types of systems that utilize various kinds of containers. In other examples, the techniques and features described herein can be used with other types of systems that do not utilize containers.

A client application may be executed in a container that provides a self-contained secure process space in the system.

The term "application" is used to refer to any combination of software products that may perform a desired function. In some cases, an application may be a single software program that operates with a hardware platform. Some applications may use multiple software components, each of which may be written in a number of different programming languages and may execute a plurality of different application processes on the hardware platform.

The PaaS system provides data associated with different applications to a plurality of clients. This data may be used for the execution of applications, which may include an "image" build from pre-existing application components and source code of the application. An image refers to an ordered set of files of the application, which are stored in a certain format and may be used to deploy functionality for a runtime instance of the application. In one implementation, the image can be built using a particular tool, such as Docker™ tool, and is also referred to as a Docker image. The tool generates an image for an application by combining multiple image layers corresponding to core functionality components of the application (e.g., a web framework, database, etc.) with source code specific to the application. An image layer includes one or more files produced by executing a sequence of one or more commands. Each image layer is generated by executing a command from a sequence of one or more commands associated with an application image. Each command may invoke, with one or more parameter values or without parameters, a built-in operating system (OS) shell command or an executable file (e.g., a binary executable or a shell script). The sequence of one or more commands may be included in a file, also referred to as a Docker file. The resulting image may be stored in an image repository (e.g., data storage system) for subsequent use in launching instances of the application images for execution in the PaaS system.

In the PaaS system, multiple clients may execute the same application. In executing the application, an instance of the application image may be generated to facilitate utilization of the application by each client. In building the application image instance, each command of the Docker file is executed to generate each image layer of the application image. The Docker file may include a significant number of commands to generate the application image. Executing each command of the Docker file results in a significant number of image layers being generated, which results in a large application image size. If an image layer is modified by an action of a client utilizing the application, a large number of computationally expensive modification operations may result in order to identify the affected image layer of the large application image and modify the affected image layer, and other image layers that may be dependent on the affected image layer, in accordance with the client action. The number of computationally expensive modification operations increases significantly if multiple clients of the plurality of clients utilizing the application cause an image layer modification in each application image instance.

Implementations of the disclosure address the above-mentioned and other deficiencies by storing, in a cache, a result generated by executing a sequence of one or more commands. In some embodiments, the result may be an image layer for use in building an application image. Responsive to receiving a request for an application image, a sequence of one or more commands for building the application image is identified. A file (i.e., a Docker file) associated with the application image may include the sequence of one or more commands for building the application image. The sequence of one or more commands may be retrieved from the file. A value of one or more parameters for at least some commands of the sequence of commands is also identified. The value of one or more parameters may be retrieved from the file associated with the application image. A caching component of a processing device determines a result from executing the sequence is cacheable. If the result is cacheable, the caching component further determines whether the sequence has been previously executed, with the same value of the parameter, to produce the result. If the sequence has been previously executed, the result of executing the sequence (e.g., in the form of the previously generated image layer) is retrieved from a cache. In some embodiments, the result may be an image layer for an application image. In such embodiments, the resulting image layer may be retrieved and combined with one or more image layers to build the application image. If the sequence has not been previously executed, the sequence is executed to generate the result and may be cached (e.g., in an image layer repository), for building subsequent application images.

Implementations of this disclosure overcome the noted deficiencies of conventional containerization systems by identifying commands and/or sequences of commands that generate cacheable image layers, and storing the results (e.g., image layers) for building subsequent application images. By using cached command results, the number of computationally expensive commands executed to produce results is decreased, resulting in a smaller PaaS system latency.

FIG. 1 is a block diagram of a distributed computer system in which implementations of the disclosure may operate. The network architecture 100 includes a cloud 130 managed by a cloud provider system 104. Cloud provider system 104 provides nodes 111A, 111N, 121A, 121N which may execute software. In some implementations, these nodes are virtual machines (VMs) that are hosted on a physical machine, such as host A 110 through host N 120, configured as part of the cloud 130. In some implementations, the host machines 110, 120 are often located in a data center. For example, nodes 111A and 111N are hosted on host A 110 in cloud 130 provided by cloud provider 104. When nodes 111A, 111N, 121A, 121N are implemented as VMs, they may be executed by operating systems (OSes) 115, 125 on hosts 110, 120. Users can interact with applications executing on the cloud-based nodes 111A, 111N, 121A, 121N using client computer systems, such as clients 160, 170, and 180, via corresponding web browser application 161, 171, and 181. In some implementations, the applications may be hosted directly on host machines 110, 120 without the use of VMs (i.e., a "bare metal" implementation), and in such an implementation, host machines 110, 120 themselves may be referred to as "nodes."

Clients 160, 170, and 180 may be connected to host machines 110, 120 in cloud 130 and cloud provider system 104 via network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host machine 110, 120 may be a server computer system, a desktop computer or any other computing device. Cloud provider system 104 may include one or more machines such as server computers, desktop computers, etc.

In one implementation, the cloud provider system 104 is coupled to a cloud controller 108 via network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as images) associated with different applications to the cloud provider system 104. In some implementations, the data may be provided to the cloud provider 104 and stored in an image repository 106. The image repository 106 may represent a single data structure or multiple data structures (databases, repositories, files, etc.) residing on one or more mass storage devices, such as magnetic or optical storage based discs, solid state drives (SSDs), or hard drives. This data may be used for the execution of applications for a multi-tenant PaaS system managed by the cloud provider controller 140.

In one implementation, the data used for execution of applications includes application images 109 built from application components and source code of the application. Each application image may include multiple layers (i.e., one or more files produced by executing a sequence of one or more commands) of files used to deploy functionality for a runtime instance of the application. In one implementation, the images 109 can be built using a Docker™ tool and is referred to as a Docker image. In other implementations, the application images can be built using other types of containerization technologies. An application image may be built in the PaaS system using an image build system 190 of the PaaS system. The image build system 190 may be provided on components hosted by cloud 130, on a server device external to the cloud 130, or even run on nodes 111A, 111N, 121A, 121N.

As discussed above, each application image includes multiple layers of files (referred to herein as image layers) used to deploy functionality for a runtime instance of the application. The image build system 190 may generate an application image by combining multiple image layers corresponding to core functional components of the application (e.g., a web framework, database, etc.). Each image layer may be generated by executing one or more commands from a sequence of one or more commands specified by a build file (e.g., a Docker file) of the application. In some embodiments, the image build system 190 may generate an application image by causing each command of the sequence of application image commands to be executed, thereby generating a set of image layers, and combining these layers to create a completed application image. In other embodiments, one or more of the image layers may have been previously generated and cached in an image layer repository 197. In such embodiments, the commands associated with generating the cached image layers may not be executed. Instead, the cached image layers may be combined with a one or more non-cacheable image layers to generate the completed application image. The resulting application image may be stored in the image repository 106 for subsequent use in launching instances of the application images for execution in the PaaS system.

The image build system 190 may include an image build controller 191 to manage creation of application images, in accordance with embodiments of the present disclosure. The image build controller 191 may execute the application image commands with a given set of parameter values to generate each image layer. In some embodiments, the parameter values may be provided by a user utilizing the application image. In other embodiments, the parameter values may be obtained from another application or program executing on the system. The image build controller 191 may include a caching component 195 that determines whether a result from executing a command associated with the application image may be cacheable. In one embodiment, the caching component 195 may determine whether image layers resulting from the execution of the application image commands are cacheable. A result from executing a command may be cacheable if, in providing one or more parameter values as input to command, the result will be generated with each execution. For example, a resulting image layer may be cacheable if, in providing one or more parameter values to the image layer command, the same image layer will be generated with each execution of the image layer command.

Responsive to determining that a result of an application image command is cacheable, caching component 195 may determine whether the command was previously executed, with the same given parameter values, to generate the resulting image layer. If the command was previously executed with the same parameter values, caching component 195 may identify the pre-existing application image layer to be retrieved and combined with one or more additional image layers to build the application image. If the command was not previously executed with the same given parameter values, image build controller 191 may execute the command with the given parameter values and store the resulting image layer in an image layer repository 197 for future use in building additional application images. The image layer repository 197 may represent a single data structure or multiple data structures (databases, repositories, files, etc.) residing on one or more mass storage devices, such as magnetic or optical storage based discs, solid-state-drives (SSDs) or hard drives. Responsive to determining that the result from executing the application image command is not cacheable, image build controller 191 may execute the image layer command to generate the resulting image layer. The resulting image layer may not be stored in the image layer repository 197 for future use, as the non-cacheable resulting image layer may change based on one or more variables of the PaaS system.

After an application image has been built, the application image may be made available as data to be loaded to the host machine 110, 120. Upon receiving a command identifying specific data (e.g., application data and files, such as application images, used to initialize an application on the cloud) from the PaaS provider controller 140, the cloud provider 104 retrieves the corresponding data from the image repository 106, creates an instance of it and loads it to the host machine 110, 120 for execution by nodes 111A, 111N, 121A, 121N. In addition, the command may identify specific data to be executed on one or more of the nodes 111A, 111N, 121A, 121N. The command may be received from the cloud controller 108, from the PaaS system controller 140, or a user (e.g., a system administrator) via a console computer or a client machine.

The PaaS system controller 140, in implementations, may include a content manager (e.g., Pulp™) to manage the application images. For example, the application images of the image repository 106 can be stored on a content distribution network (CDN) service. This CDN service can mirror locally to the client either part or all of the contents of the image repositories by storing the contents in a particular path. The CDN is used for distributing contents of the image repository in geographic proximity to the client 160, 170, 180. For example, the contents of the image repositories 106 may be hosted on a node 111A, 111N, 121A, 121N that is geographically dispersed from where the client 160, 170, 180 is running.

While various implementations are described in terms of the environment described above, the techniques described herein may be implemented in a variety of other environments including a single, monolithic computer system, as well as various other combinations of computer systems or similar devices connected in various ways. For example, the caching component 195 may be running on a node of the PaaS system hosted by cloud 130, or may execute external to cloud 130 on a separate server device. In some implementations, the caching component 195 may include more components than what is shown that operate in conjunction with the PaaS system. In another example, data from the application image may run directly on a physical host 110, 120 instead of being instantiated on nodes 111A, 111N, 121A, 121N. In some implementations, an environment other than a VM may be used to execute functionality of the PaaS applications. As such, in some implementations, a "node" providing computing functionality may provide the execution environment for an application of the PaaS system. The "node" may refer to VM or any other type of computing environment.

Figure 2:
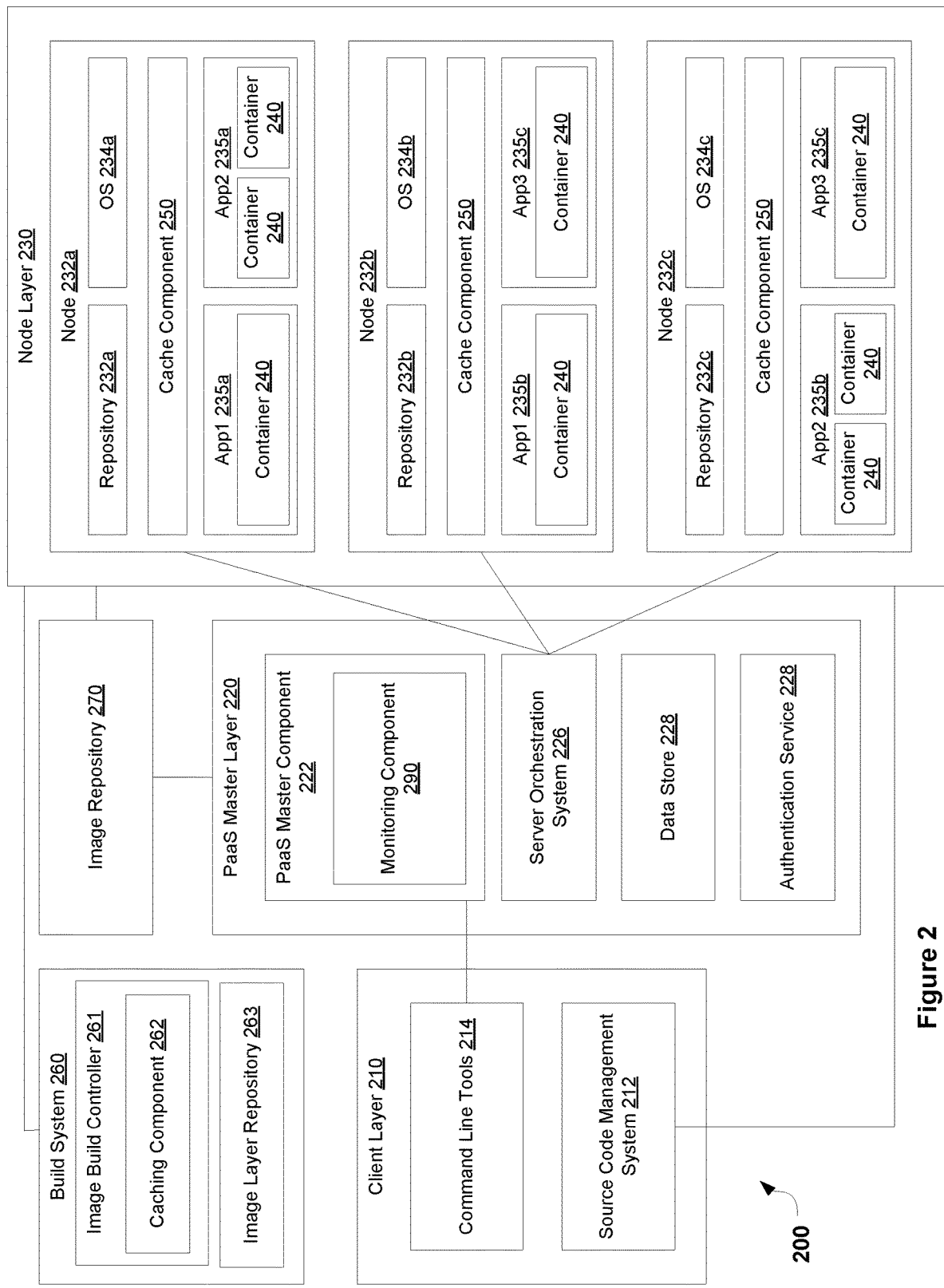
FIG. 2 is a block diagram of a Platform-as-a-Service (PaaS) system architecture, in accordance with implementations of the present disclosure.

FIG. 2 is a block diagram of a multi-tenant PaaS system architecture 200, in accordance with implementations of the present disclosure. The PaaS architecture 200 allows user to launch software applications in a cloud computing environment, such as the cloud computing environment provided in network architecture 100 described with respect to FIG. 1. The PaaS system architecture 200, in one implementation, includes a client layer 210, a PaaS master layer 220, and a node layer 230. In one implementation, the components of the PaaS system architecture 200 are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 is a collection of components that reside on a client machine, such as a workstation of a software developer, and provides an interface to a user of the client machine to the PaaS master layer 220 and the node layer 230 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210. In one implementation, the PaaS master layer 220 may comprise components executing on one or more server devices.

The client layer 210, in implementations, includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the respective node(s) 232a, 232b, 232c running the associated application. From the remote SCM repository 233a, 233b, 233c, the code of the packaged software application may be edited by others with access, or the application may be executed by a machine. Other SCM systems work in a similar manner.

The client layer 210, in one implementation, also includes a set of command line tools 214 that a user can utilize to create, launch, and manage applications using a PaaS system. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as is described in more detail further below in accordance with some implementations.

In one implementation, the PaaS master layer 220 acts as middleware between the client layer 210 and the node layer 230. The node layer 230 is a collection of components that includes the nodes 232a-c on which applications 235a-c are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action (e.g., creating, removing, and/or managing a container) on a container, such as containers 240, a request to deploy source code of an application, a request to designate a system to host a remote SCM repository (e.g., an indication that a system has been designated by a user to host a remote SCM repository), etc.

A user, using the command line tools 214 at client layer 210, can request the creation of a new application 235a-c, execution of source code of the application 235a-c, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the PaaS system by authentication service 224, the PaaS master component 222 uses a server orchestration system (not shown) to collect information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-c residing on the nodes, and acts as a controller that generates the actions requested by users via an API of the command line tools 214.

The server orchestration system 226 then takes the actions generated by the PaaS master component 222 and orchestrates their execution on the many nodes 232a-c managed by the system.

The information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

As discussed previously, the PaaS system architecture 200 of FIG. 2 is a multi-tenant PaaS environment. In a multi-tenant PaaS environment, each node 232a-c runs multiple applications 235a-c that may be owned or managed by different user and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-c. For example, as shown in FIG. 2, components of application 1 235a run in both node 232a and node 232b. Similarly, components of application 2 235b may run in node 232a and node 232c, while components of application 3 235c may run in node 232b and 232c.

In one implementation, each node 232a-c is implemented as a VM and has an operating system 234a-c that can execute applications 235a-c using their repositories 233a-c that are resident on the nodes 232a-c. Each node 232a-c can also include a server orchestration system agent (not shown) configured to track and collect information about the node 232a-c and to perform management actions on the node 232a-c. The server orchestration system agent may operate in tandem with the server orchestration system 226 to send requests, queries, and commands between the node 232a-c and the PaaS master layer 220.

As discussed above, node 232a-c runs multiple applications 235a-c. A node 232a-c runs an application by launching an instance of an application image as a container 240 in the node 232a-c. An application image includes the underlying support software that implements the functionality of applications 235a-c. An application image for an application may be built by build system 260, which may separate from, or be part of, node layer 230. Build system 260 may be the same as image build system 190 described with respect to FIG. 1.

A container 240 is a secure process space on the nodes 232a-c to execute functionality of an application 235a-c. In some implementations, a container 240 is established at the nodes 232a-c with access to certain resources of the underlying node 232a-c including memory, storage, and security types and/or labels to be applied to any functions executed by the containers 240. In one implementation, the containers 240 may be established using the Linux Containers (LXC) method. In further implementations, containers 240 may also be established using cgroups, SELinux™, and kernel namespaces, to name a few examples.

The application images for an application 235a-c launched in containers 240 may be dispersed over more than one node 232a-c. In other implementations, application images instances for an application 235*a-c* may run in one or more containers 240 on the same node. Furthermore, an application 235*a-c* may use more than one application image as part of providing functionality for the application 235*a-c*. One example of this is a JavaEE™ application that uses a JBoss™ application server-based application image with a supporting MySQL™ database provided by a MySQL™ based application image.

As discussed previously, an application image may be built by build system 260, which may be separate from, or be part of, node layer 230. Each application image includes multiple layers of files used to deploy functionality for a runtime instance of the application. Build system 260 may generate an application image by combining multiple image layers corresponding to core functional components of the application (e.g., a web framework, database, etc.) with parameter values specific to the user of the application. Each image layer may be generated by executing a sequence of one or more commands specified by a build file (e.g., a Docker file) of the application. In some embodiments, build system 260 may generate an application image by causing each command of the sequence of commands to be executed, thereby generating a set of layers. The resulting set of image layers may be combined to build a completed application image. In other embodiments, one or more of the image layers may have been previously generated and cached in an image layer repository. The cached image layers may be retrieved and combined with a set of generated image layers to create the completed application image.

Build system 260 may include a build controller 261 to manage the creation of application images using the image layers. The build controller 261 may execute the application image commands with a given set of parameters to generate a resulting image layer. The build controller 261 may include a caching component 262 that determines whether a result from executing a sequence of commands may be cacheable. In one embodiment, caching component 262 may determine whether image layers resulting from the execution of the application image commands may be cacheable.

In some embodiments, a request may be received by build controller 261 for an application image. The request may be transmitted to build controller 261 as a result of a user deploying an application 235*a-c* of node 232*a-c*. Responsive to receiving the request for the application image, build controller 261 may receive a sequence of one or more commands associated with the requested application image. In some embodiments, the commands may be identified from a file associated with building the requested application image (i.e., the Docker file). Each of the sequence of commands may include at least one value of a parameter to be used in executing the command. In some embodiments, the value of the parameter may be included in the request for the application image.

Responsive to receiving the sequence of commands for building the application image, caching component 262 may determine whether a resulting image layer generated by each of the sequence of commands is cacheable. A result from executing a command may be cacheable if, in providing one or more parameter values as input to the command, the same result will be generated with each execution.

In one embodiment, caching component 262 may determine whether the resulting image layer from executing each command of the sequence of commands is cacheable based on a categorization of the application image command. Caching component 262 may maintain a command data structure to record whether a result of a command, based on the categorization of the command, is cacheable. The command data structure is discussed in further detail with respect to FIG. 3. In another embodiment, caching component 262 may determine whether the resulting image layer from executing each command is cacheable based on a machine learning-based classifier, which may predict a probability that a resulting image layer of an application image, executed with at least one parameter value, will be the same, or substantially similar to, the resulting image layer of the command as previously executed with the same parameter values. The classifier may be preliminarily trained on a training data set including a series of results of a command as executed with the same parameter values.

In one embodiment, build controller 261 may identify a command pipeline including the set of commands in response to receiving a request for an application image. The command pipeline may be configured such that a result generated by executing a command of the command pipeline serves as a parameter value for another command of the command pipeline. For example, a command pipeline may include at least a first command and a second command, where a value of a parameter for the second command is a result generated by executing the first command. In such embodiments, build controller 261 may parse the command pipeline such to separate each command. Caching component 262 may determine whether each result generated by executing each of the parsed command pipeline commands is cacheable, in accordance with previously described embodiments. Embodiments relating to a command pipeline are discussed in further detail with respect to FIG. 4.

Responsive to caching component 262 determining that the result of the sequence of commands is not cacheable, the build controller 261 may execute the command to generate the non-cacheable result (i.e., the resulting image layer). The resulting image layer may be combined with one or more image layers to build the application image. Responsive to determining that the result of executing the sequence of commands is cacheable, caching component 262 may determine whether the sequence of commands has been previously executed with the same values of the parameters. In some embodiments, caching component 262 may determine whether the sequence of commands has been previously executed based on the command data structure previously discussed herein.

Responsive to caching component 262 determining that the sequence of commands has been previously executed with the same values of the parameters, build controller 261 may identify and retrieve cached result to build the application image. In some embodiments, build controller 261 may retrieve the cached image layer from a layer repository 263 that is configured to store cached image layers. In other embodiments, build controller 261 may retrieve the cached image layer by identifying an application image that is utilizing the cached layer. Build controller 261 may identify the application image utilizing the cached image layer based on the command data structure, described in further detail below. Upon identifying and retrieving the cached image layer, the cached image layer may be combined with one or more image layers to build the application image.

Responsive to caching component 262 determining that the command has not been previously executed with the same given parameter values, build controller 261 may execute the sequence of commands to generate the image layer to be combined with one or more other image layers in building the application image. In some embodiments, the generated image layer may be stored in the layer repository 263 to be utilized in building other application images. In other embodiments, a location of the application image utilizing the generated image layer may be stored in the command data structure As discussed previously, in some embodiments, the sequence of commands may be a command pipeline. Caching component 262 may determine whether each result from executing each of the sequence of commands is cacheable. Responsive to determining whether each result of the sequence of commands is cacheable, caching component 262 may determine whether each command of the command pipeline has been previously executed, either as part of a command pipeline or as an independently executed command, in accordance with embodiments previously described herein. In some embodiments, caching component 262 may determine that at least one result of one or more command pipeline commands is cacheable, but at least one result of one or more command pipeline commands is not cacheable. In such embodiments, the cacheable layers generated by the commands may be retrieved, in accordance with embodiments previously described. The retrieved layers may be implemented into the command pipeline to replace the associated commands. The build controller 261 may execute the command pipeline such that only the commands that do not produce cacheable results are executed.

In some embodiments a first result of a first command may be dependent on a second result of a second command (i.e., the first result of the first command is mutable). For example, a first image layer may be a value of a parameter for the command for generating a second image layer. In such embodiments, the command for generating the second image layer may be stored in the command data structure with an indication that generating the second image layer is dependent on generating the first image layer. Responsive to a subsequent request for a second application image, the command for generating the second image layer may be identified by build controller 261. Responsive to caching component 262 determining that the second image layer is cacheable and has been previously executed, build controller 261 may retrieve both the first image layer and the second image layer to be combined with one or more image layers to build the application image based on the indication that the second image layer is dependent on the first image layer.

In some implementations of the present disclosure, one or more command results may be dependent on other command results and the dependent command results may be cacheable. In such implementations, the dependent command results may be stored as a cacheable command result set, rather than as separately cacheable command results. In some embodiments, caching component 262 may utilize a dependency data structure to determine whether one or more results are dependent on other results. For example, a graphing operation may be applied to the set of commands to generate a dependency graph, such as a directed acyclic dependency tree. In some examples one branch of the dependency graph may indicate a set of commands that generate results that are dependent on one or more results in the subset. Responsive to generating the dependency graph, build system 261, for a given branch, may determine whether each of the set of command results of the branch are cacheable. Responsive to determining that each of the set of command results of the branch are cacheable, build system 261 may execute each command to generate each image result of the branch. In one embodiment, the branch may be stored at the image layer repository 263 for future utilization in building application images. In another embodiment, an indication may be stored at the command data structure indicating each command is dependent on one or more commands of the set of command results (i.e., the branch).

FIG. 3 illustrates a command data structure 300 for identifying cacheable command results, in accordance with implementations of the present disclosure. The command data structure 300 may be maintained by caching component 262, described with respect to FIG. 2. Caching component 262 may maintain the command data structure 300 to record whether a command result, based on the categorization of the command, is cacheable. The command data structure 300 may include a command name field 310 where each command may be identified by a command name. Data structure 300 may further include an arguments field 320 where one or more parameter values provided to execute the application image command are identified. In some embodiments, one or more application image commands with the same command name may be included in data structure 300 that were executed with different parameter values.

Data structure 300 may further include a change date field 330. The change date field 330 indicates that last date that a given command was modified. Caching component 262 may determine that a command and/or value of a parameter for the command has been modified by identifying a date and/or time that the request for the command result was received and comparing the identified date and/or time with the date and/or time associated with the command that is included in the command data structure 300.

A path field 340 may also be included in data structure 300. The path field 340 values may indicate a path utilized in executing a given command. In some embodiments, the path field 340 values may be used by caching component 262 to determine whether a command result is dependent on another command result. In other embodiments, the path field 340 values may be used to determine whether a command is included as part of a branch of a dependency graph, described previously herein.

A result field 350 may be included in data structure 300 to indicate a result generated by executing a command and/or a sequence of commands. In some embodiments, the values of the result field 350 may be a resulting image layer that is generated by executing the command. Cacheable field 360 may be included in data structure 300 to identify whether a result of executing the command is cacheable. As seen in FIG. 3, the results of the "echo" command and the "add command" are cacheable results 370 because, given the same parameter values, each command, when executed, will output the same result for each execution of the command. In contrast, the "my-cli" command and the "git" command are not cacheable because, given the same parameter values, each commands, when executed, may output a different result for each execution of the command.

In some embodiments, data structure 300 may further include an application image location field (not shown). The application image location field may indicate a location of an application image that is utilizing an image layer generated by executing a command included in the data structure 300. In some embodiments, when a command is added to data structure 300, a hash function (i.e., MTS, SHA256, etc.) may be applied to the command name value to generate a key value. The key value may be stored with the application image location in the application image location field. Responsive to caching component 262 determining that a result of executing a sequence of commands is cacheable, the result may be identified by applying the hashing function to the command associated with the cacheable image layer to generate a key value. The generated key value may be compared to the key value stored in the application image location field. Responsive to determining that the generated key value is the same as the key value stored with the application image field, the application image location may be provided to allow the build controller 261 of FIG. 2 to retrieve the cacheable image layer and be combined with one or more other image layers to build the application image.

Figure 4:
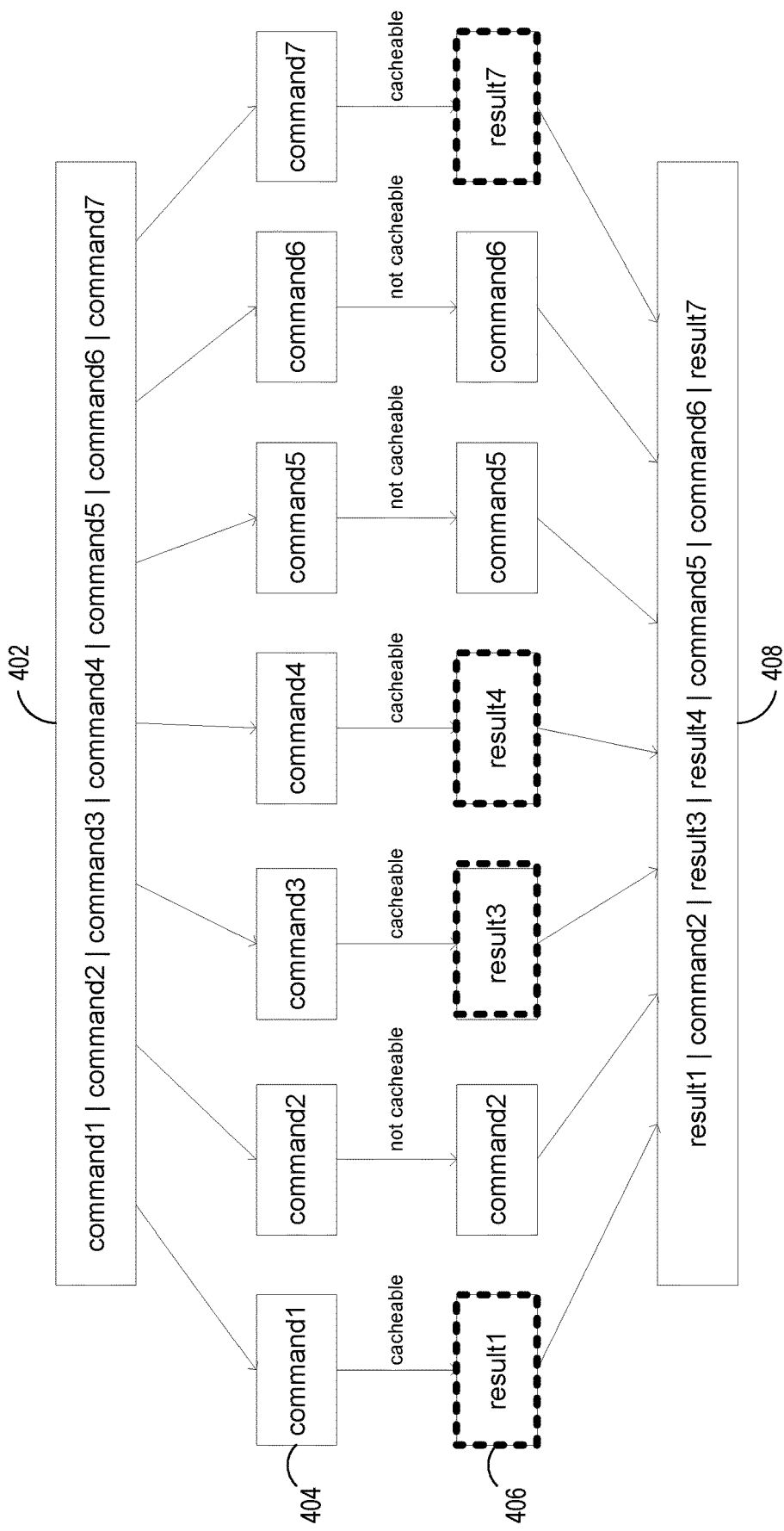
FIG. 4 illustrates identifying cacheable portions of a command pipeline with cacheable command results, in accordance with implementations of the present disclosure.

FIG. 4 illustrates identifying cacheable portions of a command pipeline 402 with cacheable command results, in accordance with implementations of the present disclosure. Command pipeline 402 may include a set of commands where a result generated by executing each of the set of commands serves as a parameter value of another command of the command pipeline 402. Responsive to identifying the command pipeline 402, the command pipeline 402 may be parsed to separate each command 404. Caching component 262 of FIG. 2 may determine whether each result from executing each command 404 of the parsed command pipeline is cacheable, in accordance with previously described embodiments. Responsive to determining whether each result from executing each command 404 is cacheable, caching component 262 may determine whether each command 404 has been previously executed, either as part of a command pipeline or as an independent command. In some embodiments, one or more commands 404 may produce cacheable results, while one or more commands 404 may produce non-cacheable results. In such embodiments, the cacheable results 406 may be retrieved in accordance with previously described embodiments. The retrieved results 406 may be implemented into the command pipeline 402 to replace the commands 404 that generate in the cacheable results, thereby generating a modified command pipeline 402. Build controller 261 of FIG. 2 may then execute the modified command pipeline 408 such that only the commands that generate the non-cacheable results are executed.

Figure 5:
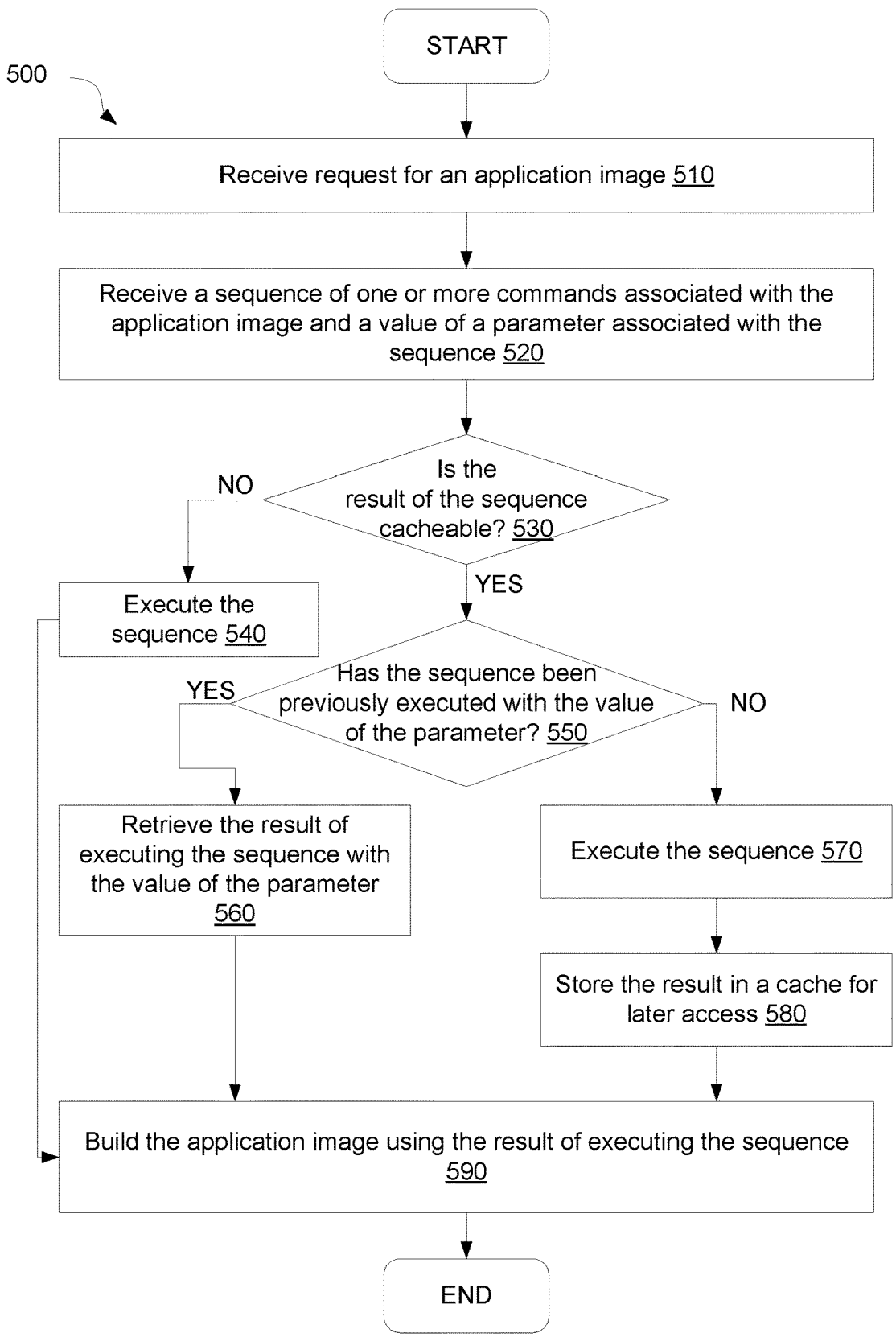
FIG. 5 is a flow diagram of a method of building an application image using cacheable command results, in accordance with implementations of the present disclosure.

FIG. 5 is a flow diagram of a method 500 of using cacheable command results, in accordance with implementations of the present disclosure. In some embodiments, the cacheable command results may be utilized in building an application image. In one implementation, method 500 may be performed by the caching component 195 as described herein. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of a PaaS system. It should be noted that blocks depicted in FIG. 5 can be performed simultaneously or in a different order than that depicted.

Referring to FIG. 5, method 500 begins at block 510 where a request for an application image is received. At block 520, a sequence of one or more commands associated with the application image and a value of a parameter associated with the sequence is received. The request may include a value of a parameter to be used in executing the command. In one embodiment, the sequence may include an application image command of a set of application image commands. At block 530, the processing device may determine whether the result of the sequence is cacheable. Responsive to determining that the result of the sequence is cacheable, method 500 may continue to block 540. Responsive to determining that the result of the sequence is not cacheable, method 500 may continue to block 550. At block 540, the processing device may execute the sequence. Responsive to executing the sequence, method 500 may continue to block 590. At block 550, the processing device may determine whether the sequence has been previously executed with the value of the parameter. Responsive to determining that the sequence has been previously executed with the value of the parameter, method 500 may continue to block 560. Responsive to determining that the first command has not been previously executed with the given parameter value, method 500 may continue to block 570. At block 560, the result of executing the sequence with the value of the parameter may be retrieved. At block 570, the sequence may be executed with the value of the parameter. At block 580, the result of executing the sequence with the value of the parameter may be stored in a cache for later access. At block 590, the application image may be built using the result of executing the sequence.

Figure 6:
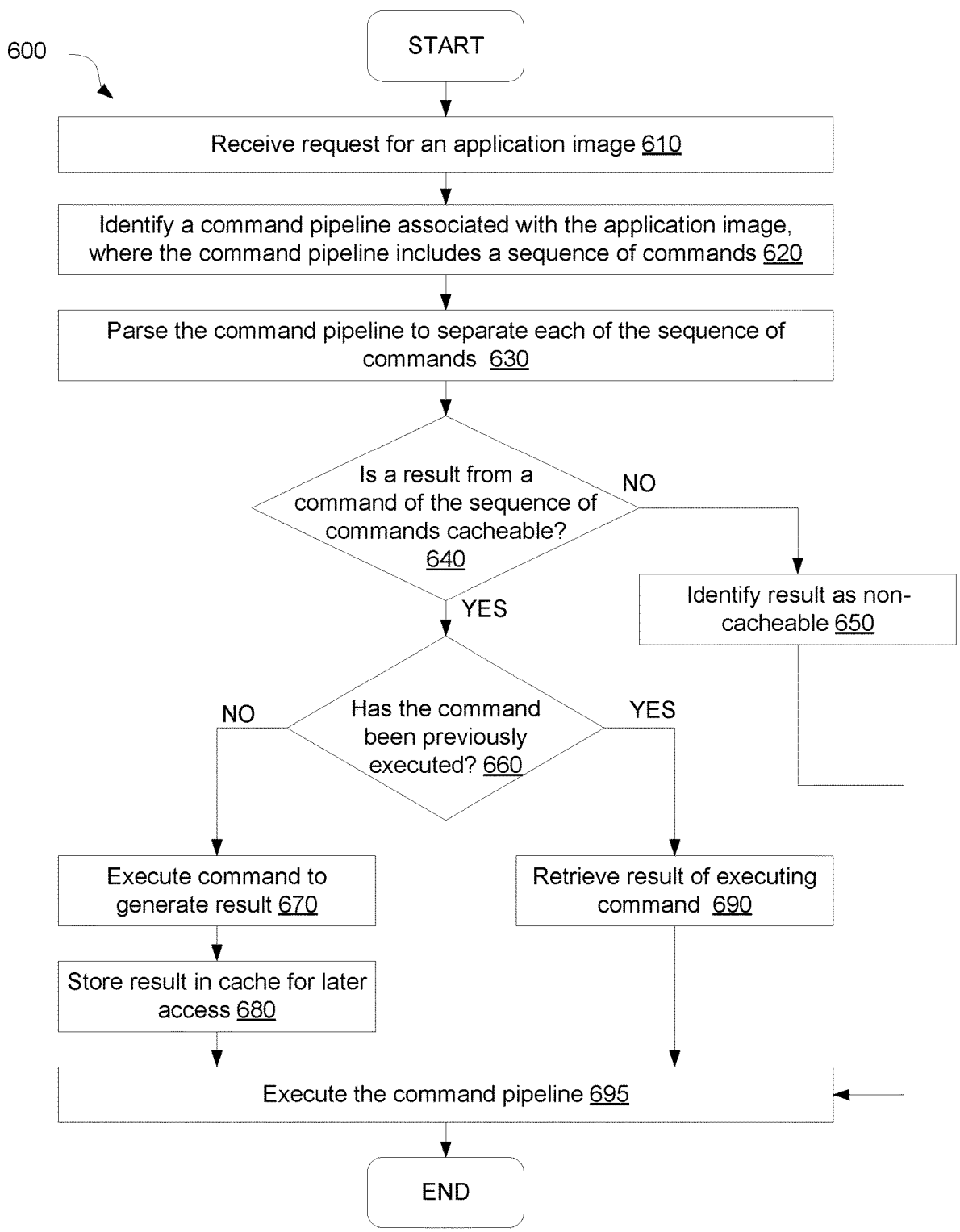
FIG. 6 is a flow diagram of a method of building an application image with a command pipeline where one or more portions with cacheable command results, in accordance with implementations of the present disclosure.

FIG. 6 is a flow diagram of a method of building an application image using a piped command where one or more portions of the piped command are cacheable, in accordance with implementations of the present disclosure. In one implementation, method 600 may be performed by the caching component 195 as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of a PaaS system. It should be noted that blocks depicted in FIG. 6 can be performed simultaneously or in a different order than that depicted.

Referring to FIG. 6, method 600 begins at block 610 where a request for an application image is received. The request may include a value of a parameter to be used in executing the command. At block 620, a command pipeline associated with the application image may be identified. The command pipeline may include a sequence of commands, wherein the sequence of commands are to be executed such that an output from one command is to be an input for another command. At block 630, the command pipeline may be parsed to separate each of the sequence of commands. At block 640, the processing device may determine, for each of the sequence of commands of the command pipeline, whether the command result is cacheable. Responsive to determining that the command result is not cacheable, method 600 continues to block 650. Responsive to determining that the command result is cacheable, method 600 continues to block 660. At block 650, responsive to a determination that the command result is not cacheable, the command is identified as having a non-cacheable command result. Responsive to identifying the command as having a non-cacheable command result, method 600 continues to block 695, described in further detail herein. At block 660, the processing device may determine, for each of the cacheable command results of the command pipeline, whether the associated command has been previously executed. Responsive to determining that the associated command has been previously executed, method 600 continues to block 690. Responsive to determining that the associated command has not been previously executed, method 600 continues to block 670. At block 670, the command may be executed with the given parameters to generate a result. The result may be provided in the command pipeline in place of the command executed to generate the result. At block 680, the result of executing the command may be stored in memory for later access. At block 690, the result of executing the command may be retrieved and provided in the command pipeline in place of the command executed to generate the result. The operations performed at blocks 640-690 may be performed iteratively for each command of the command pipeline. At block 695, the command pipeline may be executed. As discussed above with respect to blocks 670 and 690, the results of executing cacheable commands may have been provided to the command pipeline in place of the commands executed to generate the results. In such embodiments, only the commands of the command pipeline identified as non-cacheable may be executed in order to execute the command pipeline.

Figure 7:
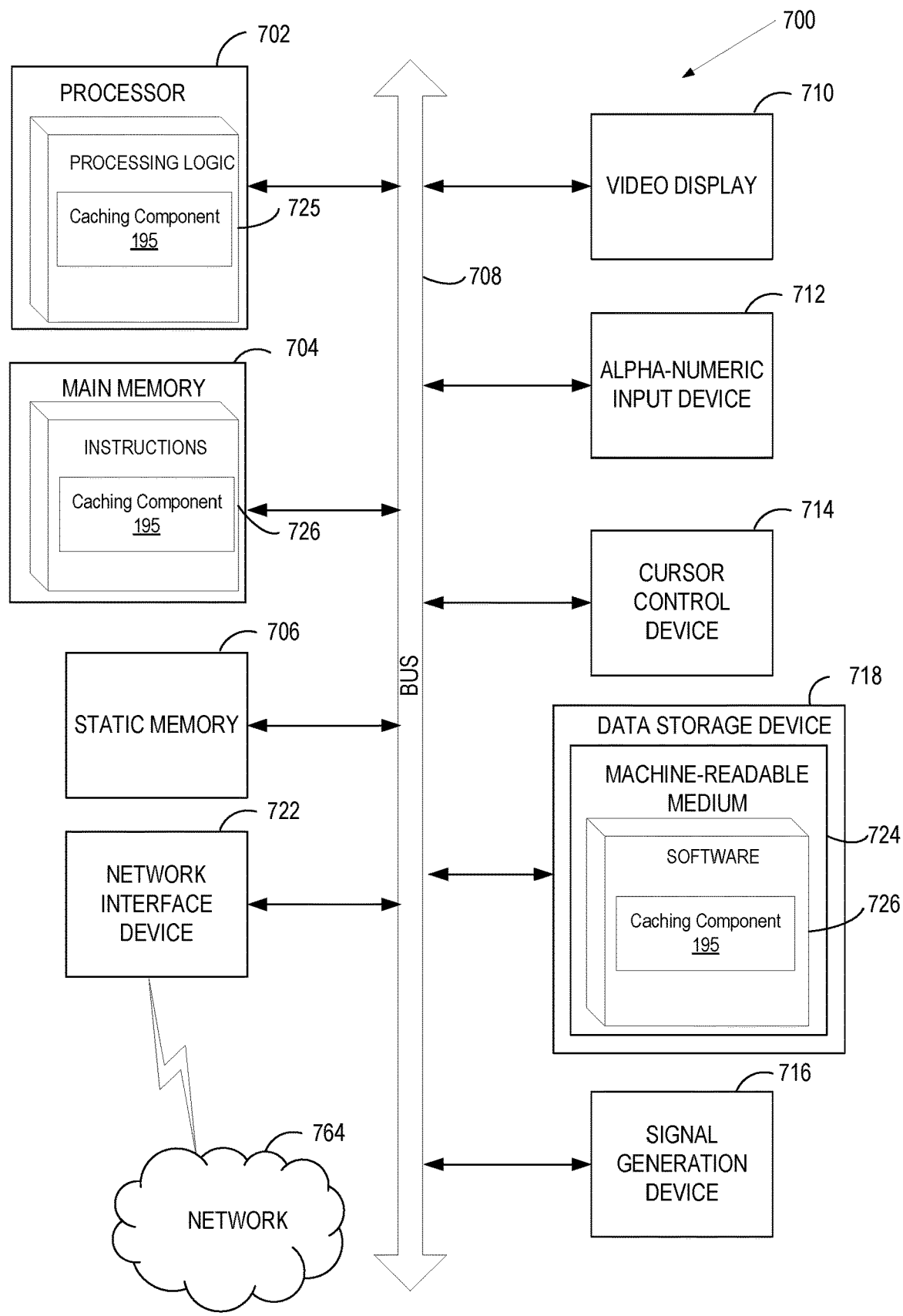
FIG. 7 is a block diagram illustrating a computer system in which implementations of the disclosure may be used.

FIG. 7 is a block diagram illustrating a computer system 700 in which implementations of the disclosure may be used. In some implementations, the computer system 700 may support caching commands for building multi-platform application container images.

The computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 802 is to execute the instructions 726 for performing the operations and steps discussed herein.

The computer system 700 may further include a network interface device 722 communicably coupled to a network 725. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 may reside, completely or partially, within volatile memory 704 and/or within processing device 702 during execution thereof by computer system 800, hence, volatile memory 704 and processing device 702 may also constitute machine-readable storage medium 724. The instructions 726 may also implement the caching component 195 to support caching results of certain commands utilized for building multi-platform application container images.

Data storage device 716 may include a computer-readable storage medium 724 (e.g., a non-transitory computer-readable storage medium) on which may store instructions 726 encoding any one or more of the methods or functions described herein, including instructions for implementing method 500 of FIG. 5 and method 600 of FIG. 6.

The non-transitory machine-readable storage medium 724 may also be used to store instructions 726 to support caching results of certain commands utilized for building multi-platform application container images described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

What is claimed is:
1. A method comprising:
  receiving, by a processing device, a request for an application image;

identifying, by the processing device, a sequence of one or more commands associated with the application image and a value of a parameter associated with the sequence of commands;
determining whether the sequence has been previously executed with the value of the parameter in view of one or more key values, wherein a first key value of the one or more key values is produced by applying a hash function to at least one command of the sequence and the value of the parameter;
responsive to determining that the sequence has been previously executed with the value of the parameter, retrieving, from a cache, a result of executing the sequence with the value of the parameter; and
building the application image using the result of executing the sequence.

2. The method of claim 1, further comprising:
responsive to determining that the sequence has not been previously executed:
  determining that the result of executing the sequence is cacheable;
  generating the result of executing the sequence by executing the sequence; and
  storing the result of executing the sequence in the cache.

3. The method of claim 1, wherein determining that the sequence has been previously executed comprises:
comparing the first key value with each of a plurality of second key values, wherein each of the plurality of second key values corresponds to a previously executed sequence of one or more commands; and
identifying a second key value of the plurality of second key values that matches the first key value.

4. The method of claim 1, further comprising:
determining that a first command of the sequence is cacheable and one or more second commands of the sequence are not cacheable;
retrieving, from the cache, a result of executing the first command with the value of the parameter; and
executing the sequence, without executing the first command.

5. The method of claim 1, wherein the sequence of one or more commands further comprises a first command and a second command, and wherein a result of executing the first command comprises a value of the parameter for the second command.

6. The method of claim 5, further comprising:
producing, by executing the second command with the result of executing the first command as the value of the parameter for the second command, the result of executing the second command;
storing the result of executing the second command, and an indication that the result of executing the second command is dependent on the result of executing the first command, in the cache; and
building the application image using the result of executing the second command.

7. The method of claim 1 further comprising:
determining that the value of the parameter has been modified;
generating a result of executing a first command of the sequence by executing the first command with the value of the parameter;
responsive to generating the result of executing the first command, generating a result of executing a second command by executing the second command with the result of executing the first command; and
building the application image using the result of the first command and the result of the second command.

8. A system comprising:
a memory; and
a processing device communicably coupled to the memory, the processing device to:
  receive a request for an application image;
  identify a sequence of one or more commands associated with the application image and a value of a parameter associated with the sequence of commands;
  determine whether the sequence has been previously executed with the value of the parameter in view of one or more key values, wherein a first key value of the one or more key values is produced by applying a hash function to at least one command of the sequence and the value of the parameter;
  responsive to determining that the sequence has been previously executed with the value of the parameter, retrieve, from a cache associated with the memory, a result of executing the sequence with the value of the parameter; and
  build the application image using the result of executing the sequence.

9. The system of claim 8, wherein the processing device is further to, responsive to determining that the sequence has not been previously executed:
determine that the result of executing the sequence is cacheable;
generate the result of executing the sequence by executing the sequence; and
store the result of executing the sequence in the cache.

10. The system of claim 9, wherein to determine that the sequence has been previously executed, the processing device is to:
compare the first key value with each of a plurality of second key values, wherein each of the plurality of second key values corresponds to a previously executed sequence of one or more commands; and
identify a second key value of the plurality of second key values that correspond with the first key value.

11. The system of claim 8, wherein the processing device is further to:
determine that a first command of the sequence is cacheable and one or more second commands of the sequence are not cacheable;
retrieve, from the cache, a result of executing the first command with the value of the parameter; and
execute the sequence, without executing the first command.

12. The system of claim 8, wherein the sequence of one or more commands further comprises a first command and a second command, and wherein a result of executing the first command is a value of the parameter for the second command.

13. The system of claim 12, wherein the processing device is further to:
produce, by executing the second command with the result of executing the first command as the value of the parameter for the second command, the result of executing the second command;
store the result of executing the second command, and an indication that the result of executing the second command is dependent on the result of executing the first command, in the cache; and
build the application image using the result of executing the second command.

14. A non-transitory computer-readable medium having instructions stored therein that, when executed by a processing device, cause the processing device to:
receive a request for an application image;
identify a sequence of one or more commands associated with the application image and a value of a parameter associated with the sequence of commands;
determine whether the sequence has been previously executed with the value of the parameter in view of one or more key values, wherein a first key value of the one or more key values is produced by applying a hash function to at least one command of the sequence and the value of the parameter;
responsive to determining that the sequence has been previously executed with the value of the parameter, retrieve, from a cache, a result of executing the sequence with the value of the parameter; and
build the application image using the result of executing the sequence.

15. The non-transitory computer-readable medium of claim 14, wherein the processing device is further to, responsive to determining that the sequence has not been previously executed:
determine that the result of executing the sequence is cacheable;
generate the result of executing the sequence by executing the sequence; and
store the result of executing the sequence in the cache.

16. The non-transitory computer-readable medium of claim 14, wherein to determine that the sequence has been previously executed, the processing device is to:
compare the first key value with each of a plurality of second key values, from a data structure of the cache, wherein each of the plurality of second key values corresponds to a previously executed sequence of one or more commands; and
identify a second key value of the plurality of second key values that correspond with the first key value.

17. The non-transitory computer-readable medium of claim 14, the processing device is further to:
determine that a first command of the sequence is cacheable and one or more second commands of the sequence are not cacheable;
retrieve, from the cache, a result of executing the first command with the value of the parameter; and
execute the sequence, without executing the first command.

18. The non-transitory computer-readable medium of claim 14, wherein the sequence of one or more commands further comprises a first command and a second command, and wherein a result of executing the first command is a value of the parameter for the second command.

19. The non-transitory computer-readable medium of claim 18, wherein the processing device is further to:
produce, by executing the second command with the result of executing the first command as the value of the parameter for the second command, the result of executing the second command;
store the result of executing the second command, and an indication that the result of executing the second command is dependent on the result of executing the first command, in the cache; and
build the application image using the result of executing the second command.

20. The non-transitory computer-readable medium of claim 14, wherein the processing device is further to:
determine that the value of the parameter has been modified;
generate a result of executing a first command of the sequence by executing the first command with the value of the parameter;
responsive to generating the result of executing the first command, generate a result of executing a second command by executing the second command with the result of executing the first command; and
build the application image using the result of the first command and the result of the second command.

* * * * *